United States Patent
Bingel

Patent Number: 6,078,613
Date of Patent: *Jun. 20, 2000

[54] SYSTEM AND METHOD FOR BRIDGING MULTIPLE COMMUNICATION DEVICES TO A SINGLE COMMUNICATION CONNECTION

[75] Inventor: Thomas J. Bingel, Belleair Beach, Fla.

[73] Assignee: Paradyne Corporation, Largo, Fla.

[*] Notice: This patent issued on a continued prosecution application filed under 37 CFR 1.53(d), and is subject to the twenty year patent term provisions of 35 U.S.C. 154(a)(2).

[21] Appl. No.: 08/996,709

[22] Filed: Dec. 23, 1997

Related U.S. Application Data

[60] Provisional application No. 60/049,886, Jun. 17, 1997.

[51] Int. Cl.[7] .................. H04L 5/14; H04B 3/00
[52] U.S. Cl. .......................... 375/220; 375/258
[58] Field of Search .................. 375/257, 258, 375/219, 220; 379/93.01, 93.07, 399, 402; 330/252

[56] References Cited

U.S. PATENT DOCUMENTS

| | | | |
|---|---|---|---|
| 4,596,023 | 6/1986 | Driver et al. | 375/286 |
| 5,121,080 | 6/1992 | Scott, III et al. | 330/260 |
| 5,264,958 | 11/1993 | Johnson | 364/239 |
| 5,504,811 | 4/1996 | Kiko et al. | 379/347 |
| 5,528,630 | 6/1996 | Ashley et al. | 375/258 |
| 5,585,763 | 12/1996 | Navabi et al. | 330/255 |
| 5,671,376 | 9/1997 | Bucher et al. | 710/129 |
| 5,825,819 | 10/1998 | Cogburn | 375/258 |
| 5,838,722 | 11/1998 | Consi | 375/219 |

*Primary Examiner*—Tesfaldet Bocure
*Attorney, Agent, or Firm*—Thomas, Kayden, Horstemeyer & Risley, L.L.P.

[57] ABSTRACT

A transceiver capable of transmitting and receiving current-driven communication signals is implemented within a communication system, for example a subscriber loop associated with the public-switched-telephone-network (PSTN). By utilizing current drivers having high source impedance the load across a communication connection servicing the transceiver is significantly reduced such that additional transceivers may be bridged to the communication connection without substantially affecting the quality of the communication signals.

18 Claims, 10 Drawing Sheets

SYSTEM AND METHOD FOR BRIDGING MULTIPLE COMMUNICATION DEVICES TO A SINGLE COMMUNICATION CONNECTION

CROSS REFERENCE TO RELATED APPLICATION

This document claims priority to and the benefit of the filing date of copending provisional application entitled NORTON (CURRENT) TRANSCEIVER FOR MULTIDROP/MULTIPOINT DSL, assigned serial number 60/049,886 filed Jun. 17, 1997, and is hereby incorporated by reference.

FIELD OF THE INVENTION

The present invention generally relates to data communication and, in particular, to a system and method of transmitting and receiving current-driven communication signals so that multiple tributaries may be bridged to a single communication connection.

BACKGROUND OF THE INVENTION

A conventional communication system typically includes two tributaries connected across a communication connection such as a subscriber loop associated with a public-switched-telephone-network (PSTN). The communication connection includes a pair of twisted wires terminated by the two tributaries so that the two tributaries may communicate with each other in either half-duplex or full-duplex communications.

Conventional tributaries include transceivers, such as modems, to receive and transmit data. These transceivers include a voltage driver which has a low source impedance to drive the communication signal across the connection. Consequently, bridging additional voltage-driven tributaries to an end of the communication connection significantly loads the connection making it difficult to successfully communicate across the connection.

As a result of the difficulty of bridging multiple voltage-driven tributaries to the connection, prior art systems typically increase the number of connections so that each tributary at a customer premises is serviced by a separate communication connection. The insertion of additional connections into the system increases the overall cost of the system, particularly when the connection is a subscriber loop associated with a PSTN.

Thus, a heretofore unaddressed need exists in the industry for providing a system and method of bridging multiple communication devices to an end of a communication connection without substantially increasing the load carried by the connection.

SUMMARY OF THE INVENTION

The present invention overcomes the inadequacies and deficiencies of the prior art as discussed herein. The present invention provides a system and method of transmitting and receiving current-driven communication signals.

The present invention utilizes a transmitter and a receiver The transmitter is preferably configured to include a current driver to drive a communication signal across a communication connection. The receiver is designed to receive the communication signal and to process the signal for use by conventional data communication equipment.

In accordance with another feature of the present invention, the transmitter can be configured as a single-ended transmitter generating a transmit signal asymmetrically shifted with respect to ground. The receiver can be configured to receive this asymmetrically shifted signal and to rebalance the signal with respect to ground.

In accordance with another feature of the present invention, the transmitter can be configured to generate a differential balanced transmit signal requiring no rebalancing by the receiver.

The present invention has many advantages, a few of which are delineated hereafter, as mere examples.

An advantage of the present invention is that the communication signal is transmitted by a current driver having a high source impedance. Therefore, multiple transceivers may be bridged to a single communication connection without significantly loading the communication connection.

Another advantage of the present invention is that multiple transceivers may be serviced at a customer premises without incurring the cost of adding more subscriber loops.

Other features and advantages of the present invention will become apparent to one skilled in the art upon examination of the following drawings in the detailed description. It is intended that all such features and advantages be included herein within the scope of the present invention, as is defined by the claims.

BRIEF DESCRIPTION OF THE DRAWINGS

The invention can be better understood with reference to the following drawings. The elements of the drawings are not necessarily to scale relative to each other, emphasis instead being placed upon clearly illustrating the principles of the invention. Furthermore, like reference numerals designate corresponding parts throughout the several views.

DETAILED DESCRIPTION OF THE INVENTION

Figure 1:
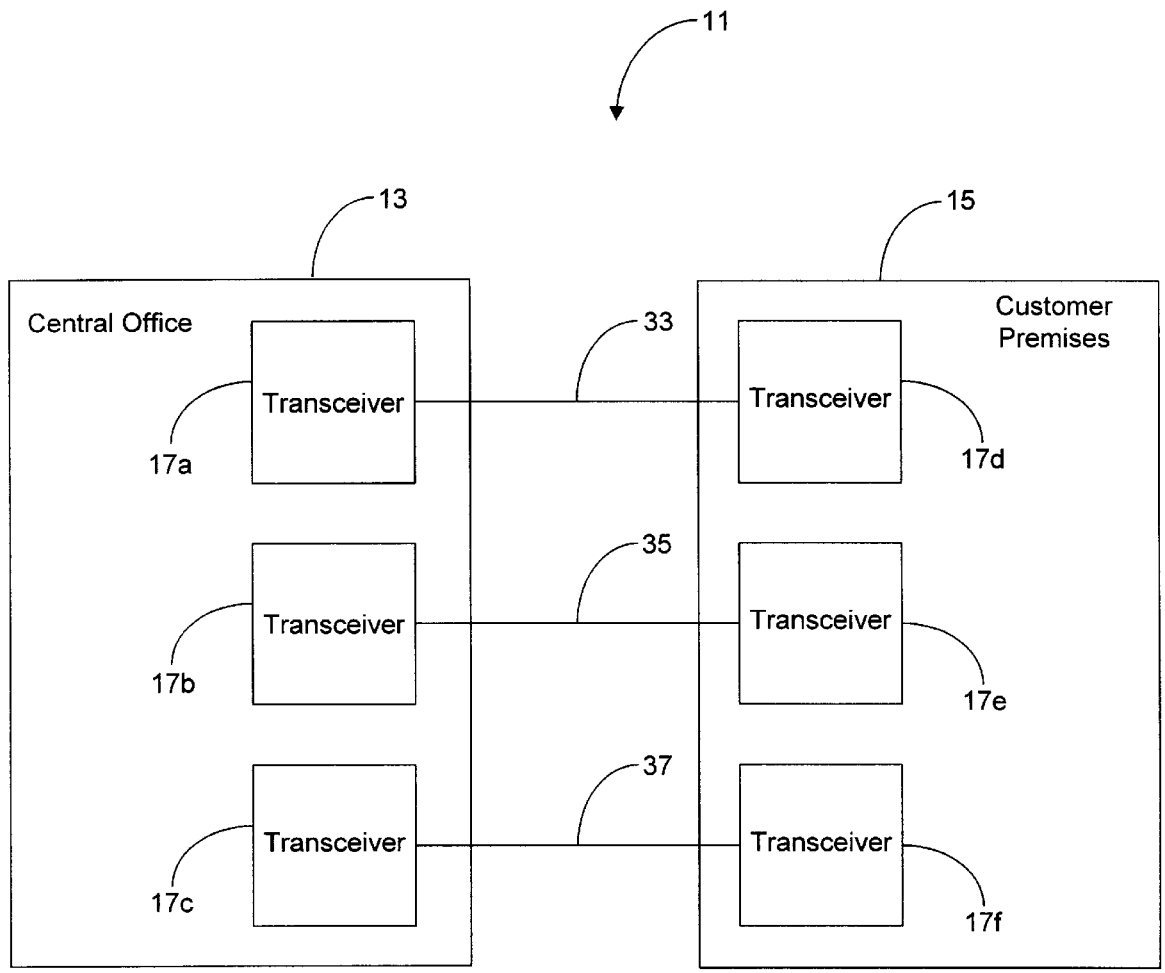
FIG. 1 is a block diagram illustrating a communication system in accordance with the prior art.

A typical communication system 11 of the prior art is configured to communicate data between a central office 13 and a customer premises 15 as depicted in FIG. 1. As known in the art, the central office 13 is typically part of a public-switched-telephone-network (PSTN) and controls the interface between the PSTN and customer premises 15. Central office 13 may include multiple transceivers 17a, 17b and 17c, for example, to transmit and/or receive data at the central office 13, and customer premises 15 may include multiple transceivers 17d, 17e and 17f, for example, to transmit and/or receive data at customer premises 15. Each transceiver 17 is usually located within a tributary (not shown), such as a modem, which further processes the received data after reception by transceiver 17.

Each transceiver 17a, 17b or 17c at central office 13 is configured to communicate with a single transceiver 17d, 17e or 17f over a single communication connection 33, 35 or 37 For example, as depicted by FIG. 1, transceiver 17a communicates with transceiver 17d across connection 33. Furthermore, transceiver 17b of central office 13 communicates with transceiver 17e of customer premises 15 across connection 35, and transceiver 17c of central office 13 communicates with transceiver 17f of customer premises 15 across connection 37.

Connections 33, 35 and 37 are typically twisted pair wire connections capable of supporting transmission of data to and from central office 13 and customer premises 15. Twisted pair wire connections 33, 35 and 37 are commonly referred to as PSTN "subscriber loops" because they connect central office 13 to the subscriber at the customer premises 15. However, as known in the art, telephone connections support data communication with devices other than telephones, such as modems, for example.

Typically, transceivers 17 utilize voltage drivers to transmit communication signals. Voltage drivers have a low source impedance making it difficult to bridge more than one transceiver 17 at either end of a connection 33, 35 or 37. In this regard, bridging multiple voltage-driven transceivers 17 to either end of a connection significantly increases the load on the connection making successful communication across the connection difficult, if not impossible Consequently, prior art systems typically connect only one transceiver to each end of a connection in order to keep the load on each connection within usable levels. Therefore, in order to support multiple independent transceivers 17d, 17e and 17f at customer premises 15, three different connections 33, 35 and 37a are typically needed wherein each connection 33, 35 and 37 supports a single customer premises transceiver 17d, 17e and 17f, respectively.

Figure 2:
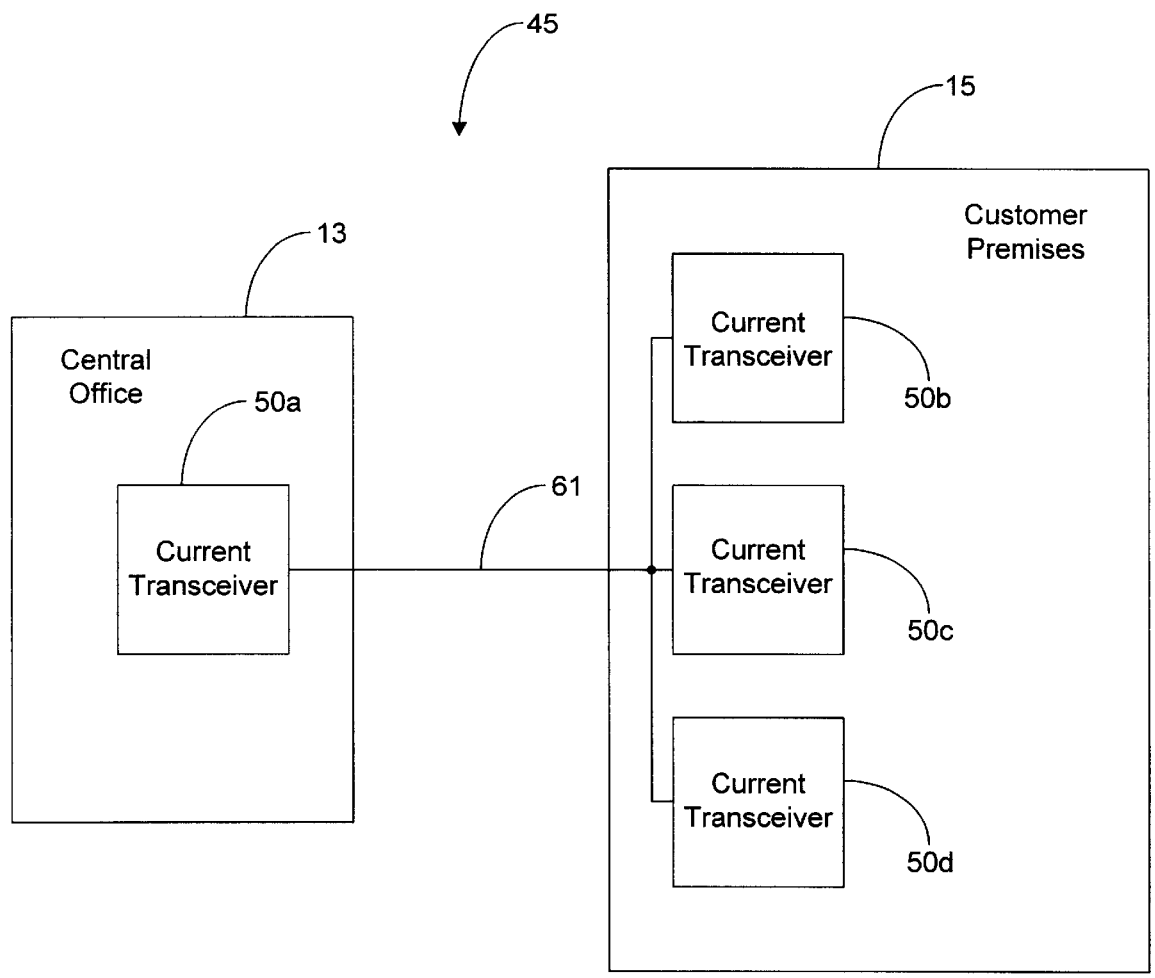
FIG. 2 is a block diagram illustrating a communication system in accordance with the present invention.

The present invention, on the other hand, is capable of efficiently supporting multiple transceivers at customer premises 15 over a single connection. A subscriber loop system 45 in accordance with the first embodiment of the present invention is depicted in FIG. 2. Instead of using voltage-driven transceivers 17, the present invention utilizes current-driven transceivers 50, as shown in FIG. 2. The current-driven transceivers 50 are particularly suited for operation with the communications device disclosed in co-pending U.S. patent application entitled, "Apparatus and Method for Communicating Voice and Data between a Customer Premises and a Central Office," filed on Nov. 3, 1997, by Bremer et al. and assigned Ser. No. 08/962,796 which is incorporated herein by reference as if set forth in full hereinbelow.

In the first embodiment, a current transceiver 50a of central office 13 is configured to communicate with multiple current transceivers 50b, 50c and 50d of customer premises 15 via connection 61. Unlike the voltage-driven transceivers 17 of the prior art, current-driven transceivers 50 have a high source impedance Therefore, each transceiver 50b, 50c and 50d of customer premises 13 may be bridged to connection 61 without significantly loading connection 61.

Figure 3A:
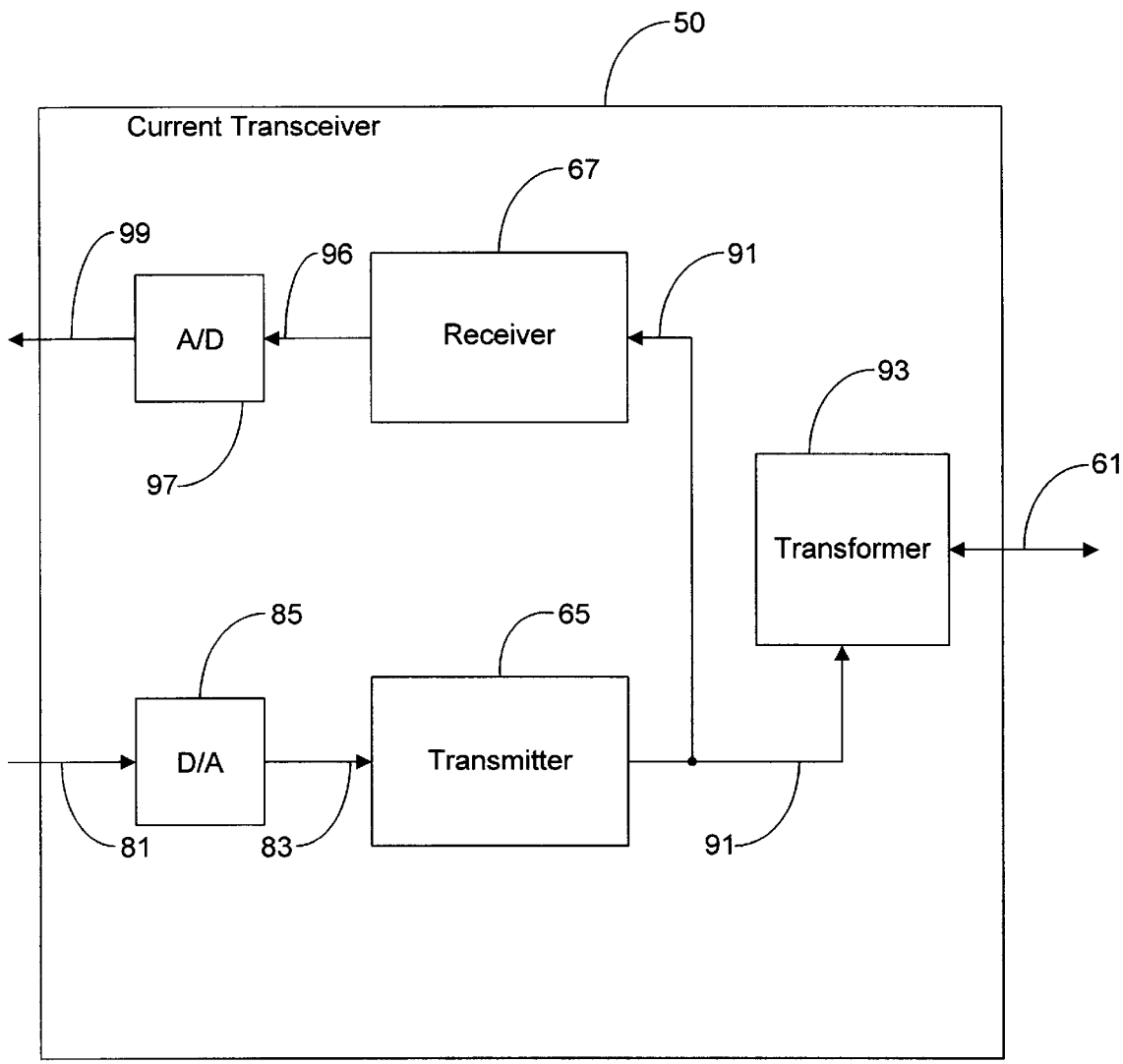
FIG. 3A is a block diagram illustrating the current transceiver of FIG. 2 in accordance with the first embodiment of the present invention.

FIG. 3A depicts a more detailed view of a transceiver 50 in accordance with the first embodiment. Transceiver 50 is designed to receive a digital current signal on connection 81 from data communication equipment (riot shown) and to convert the digital signal into an analog signal on connection 83 via digital-to-analog converter 85. A "current signal" refers to a signal generated by a current source. Transmitter 65 is preferably configured to receive the analog signal in current form on connection 83 and to transmit the signal across connection 91 through transformer 93 and across connection 61 for reception by another transceiver 50.

Figure 3B:
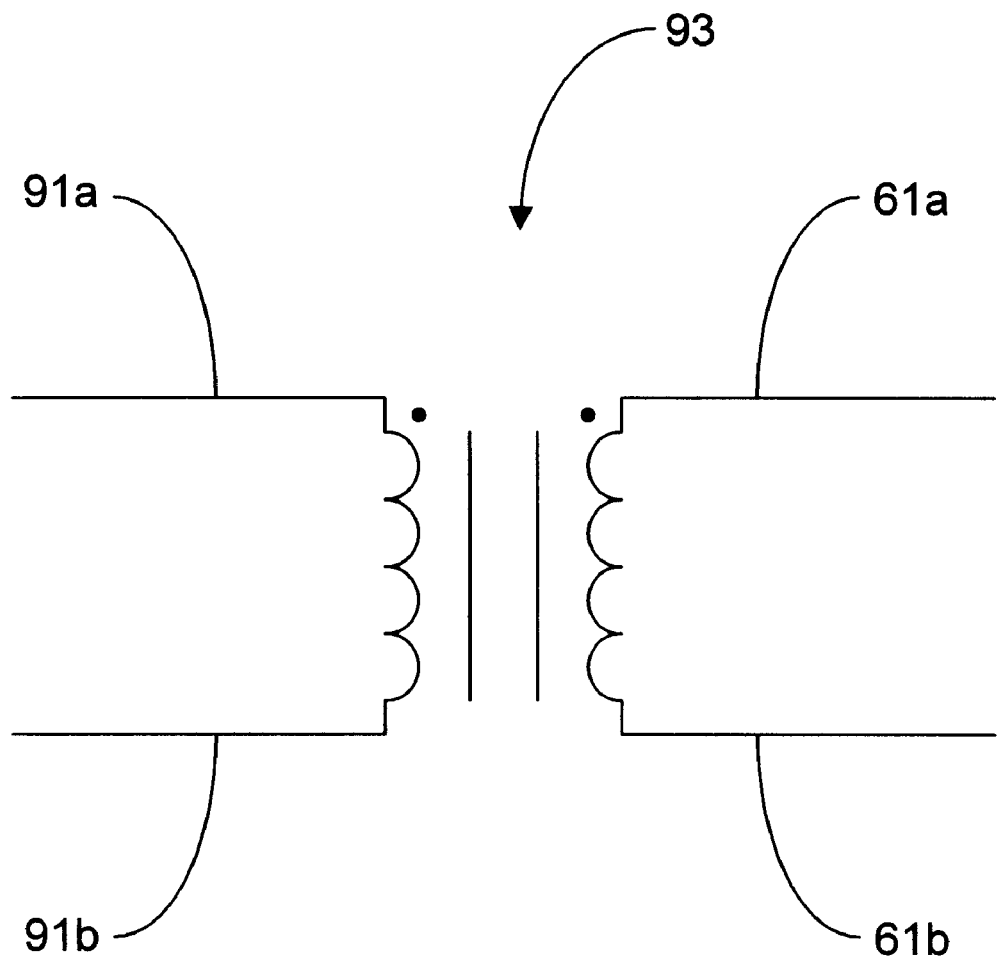
FIG. 3B is a schematic diagram illustrating the transformer of FIG. 3A.

A transformer 93 in accordance with the first embodiment is depicted in FIG. 3B. As can be seen by reference to FIG. 3B, connections 61 and 91 each have a pair of electrical lines associated therewith. Connection 61 includes two lines 61a and 61b, and connection 91 includes two lines 91a and 91b. Transmission across these connections 61 and 91 will be discussed in further detail hereinbelow.

Referring again to FIG. 3A, receiver 67, via connection 91 and transformer 93, is designed to receive a signal transmitted across connection 61. Receiver 67 is then configured to convert the signal received on connection 91 to a balanced differential signal and to output this signal on connection 96. Analog-to-digital converter 97 is designed to receive the analog differential signal on connection 96 and to convert the signal into a digital signal on connection 99. The digital signal on connection 99 may then be received and processed by data communication equipment (not shown) in accordance with principles already established in the prior art.

Transmitter

Figure 3C:
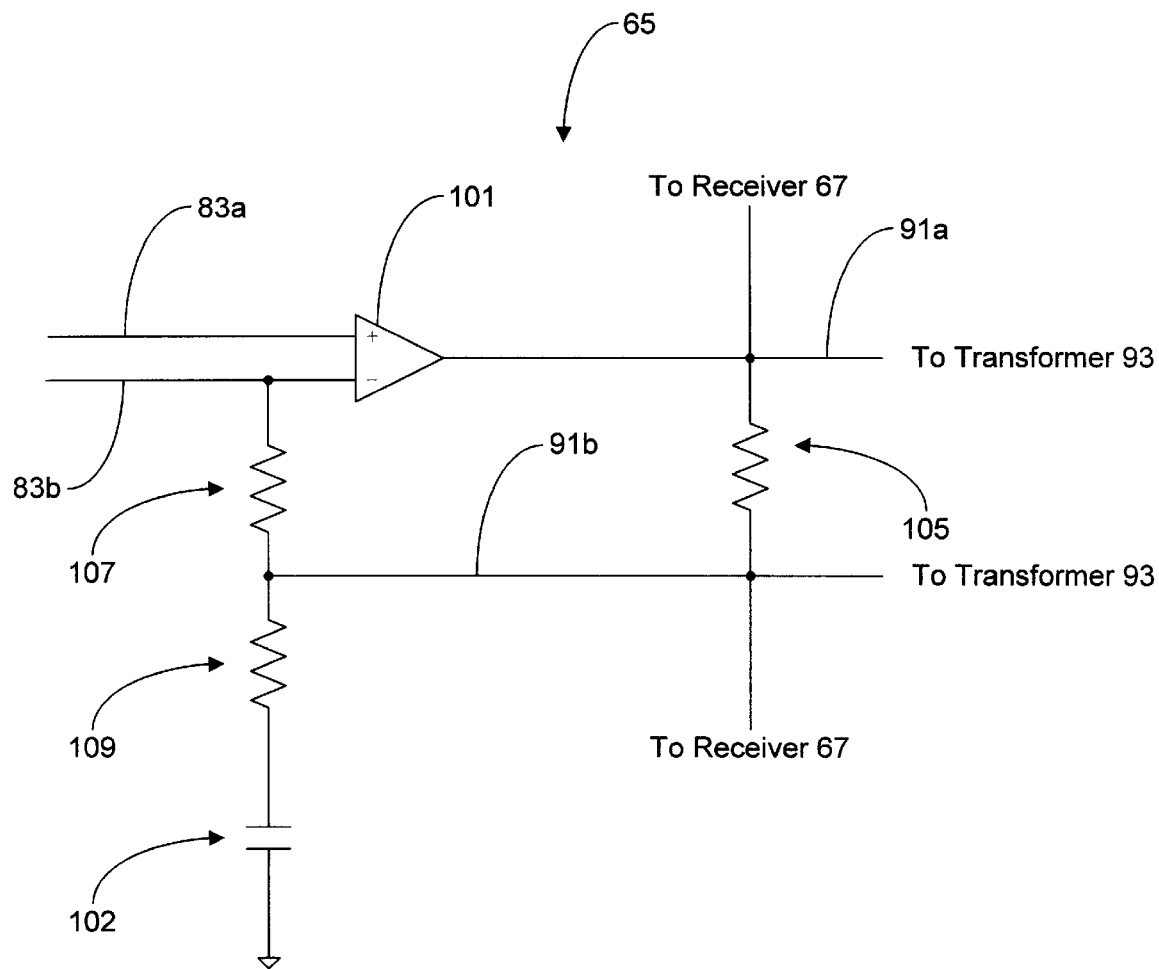
FIG. 3C is a schematic diagram illustrating the transmitter of FIG. 3A.

FIG. 3C depicts a more detailed view of transmitter 65. With reference to FIG. 3C, operational amplifier 101 receives the analog signal from digital-to-analog converter 85 on connection 83. When the analog signal is a current signal, operational amplifier 101 is designed to receive the analog current signal on connection 83b. In this case, connection 83a should be coupled to a direct current (DC) voltage reference which acts as an alternating current (AC) ground. However, when the analog signal is a voltage signal, operational amplifier 101 is designed to receive the analog voltage signal on connection 83a. After receiving the analog signal, operational amplifier 101 operates as a current driver by amplifying the analog signal.

It should be noted that it may be desirable to filter the signal on connection 83a or 83b prior to amplification by operational amplifier 101 in order to eliminate some of the out-of-band energy associated with the signal on connection 83a or 83b. Any suitable filtering device (not shown) may be utilized for this purpose, particularly a bandpass filter with an appropriate bandpass range.

As can be appreciated by one ordinarily skilled in the art upon examination of FIG. 3C, the configuration of operational amplifier 101, capacitor 102, resistors 105, 107, and 109 is designed to drive the signal on connection 83a or 83b across connection 91 to transformer 93. A After passing through transformer 93, the signal transmitted by transmitter 65 is transmitted across connection 61.

Table 1, set forth hereafter, shows an example set of possible values for capacitor 102 and resistors 105, 107, and 109 which are sufficient for correct operation of the present invention.

TABLE 1

| DEVICE | VALUE |
| --- | --- |
| 102 | 47 micro-Farad |
| 105 | 13,500 Ohms |
| 107 | 60 Ohms |
| 109 | 10 Ohms |

It should be apparent to one skilled in the art that the values in Table 1 may be modified without departing from the principles of the present invention.

Because transmitter 65 (FIGS. 3) utilizes a single operational amplifier 101 (FIG. 5), transmitter 65 is a single-ended transmitter which transmits signals asymmetrically shifted around ground. For example, with the values of Table 1, the signal on connection 61 (FIG. 3) should be offset by about positive 92.5% and negative 7.5%. Therefore, 92.5% of the transmitted signal on connection 61 is in the positive range relative to ground, and 7.5% of the signal is in the negative range relative to ground. As known in the art, ground is a reference voltage provided to the system 45 typically defined as the zero (0) voltage level of the system 45.

Receiver

Figure 3D:
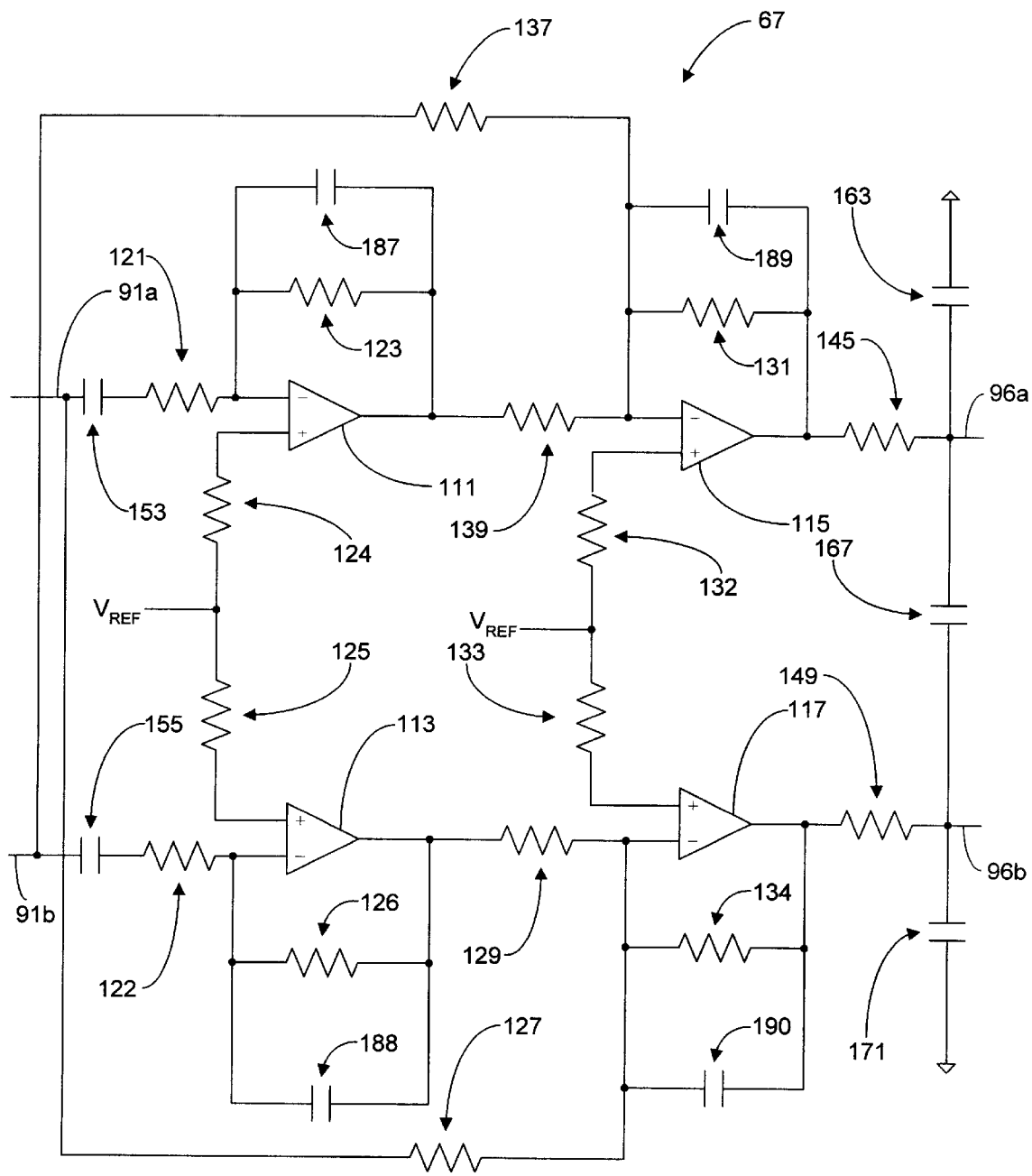
FIG. 3D is a schematic diagram illustrating the receiver of FIG. 3A.

Receiver 67 of transceiver 50 is designed to receive the signal transmitted across connection 61 via connection 91 in accordance with FIG. 3D. As discussed hereinbefore, the signal received on connection 91, when transmitted by the single-ended transmitter 65 of FIG. 3B, is asymmetrically shifted around ground. In performing analog-to-digital conversion it is desirable to have the analog signal balanced with respect to ground such that 50% of the signal is in the positive range with respect to ground and 50% of the signal is in the negative range with respect to ground. Therefore, the receiver 67 circuitry of FIG. 3D is designed to amplify the signal received on connections 91a and 91b and to convert the signal into a balanced differential signal at connections 96a and 96b. The differential signal at connections 96a and 96b can then be applied to analog-to-digital converter 97 of FIG. 2 as described hereinabove.

Table 2 depicts an example set of possible values for capacitors 187–190 and resistors 121–149 which are sufficient to adequately amplify and balance the signal transmitted by transmitter 65 of FIG. 3C.

TABLE 2

| DEVICE | VALUE | DEVICE | VALUE |
| --- | --- | --- | --- |
| 121 | 49,900 Ohms | 137 | 49,900 Ohms |
| 122 | 49,900 Ohms | 145 | 100 Ohms |
| 123 | 24,900 Ohms | 149 | 100 Ohms |
| 124 | 24,900 Ohms | 153 | 1 nano-Farad |
| 125 | 24,900 Ohms | 155 | 1 nano-Farad |
| 126 | 24,900 Ohms | 163 | 4.7 nano-Farad |
| 127 | 49,900 Ohms | 167 | 4.7 nano-Farad |
| 129 | 24,900 Ohms | 171 | 4.7 nano-Farad |
| 131 | 100,000 Ohms | 187 | 10 pico-Farads |
| 132 | 24,900 Ohms | 188 | 10 pico-Farads |
| 133 | 24,900 Ohms | 189 | 10 pico-Farads |
| 134 | 100,000 Ohms | 190 | 10 pico-Farads |

It should be apparent that these values may be modified without departing from the principles of the present invention.

The operational amplifiers 111, 113, 115, and 117 of FIG. 3D form two cross coupled via resistors 127 and 137 to perform the symmetric conversion. Operational amplifiers 111 and 113, resistors 121–126, and capacitors 153, 155, 187, and 188 form the first stage, and operational amplifiers 115 and 117, resistors 129, 131–134 and 139, and capacitors 189 and 190 form the second stage. Multiple stages may be added to receiver 67 without departing from the principles of the present invention.

Second Embodiment

Figure 4A:
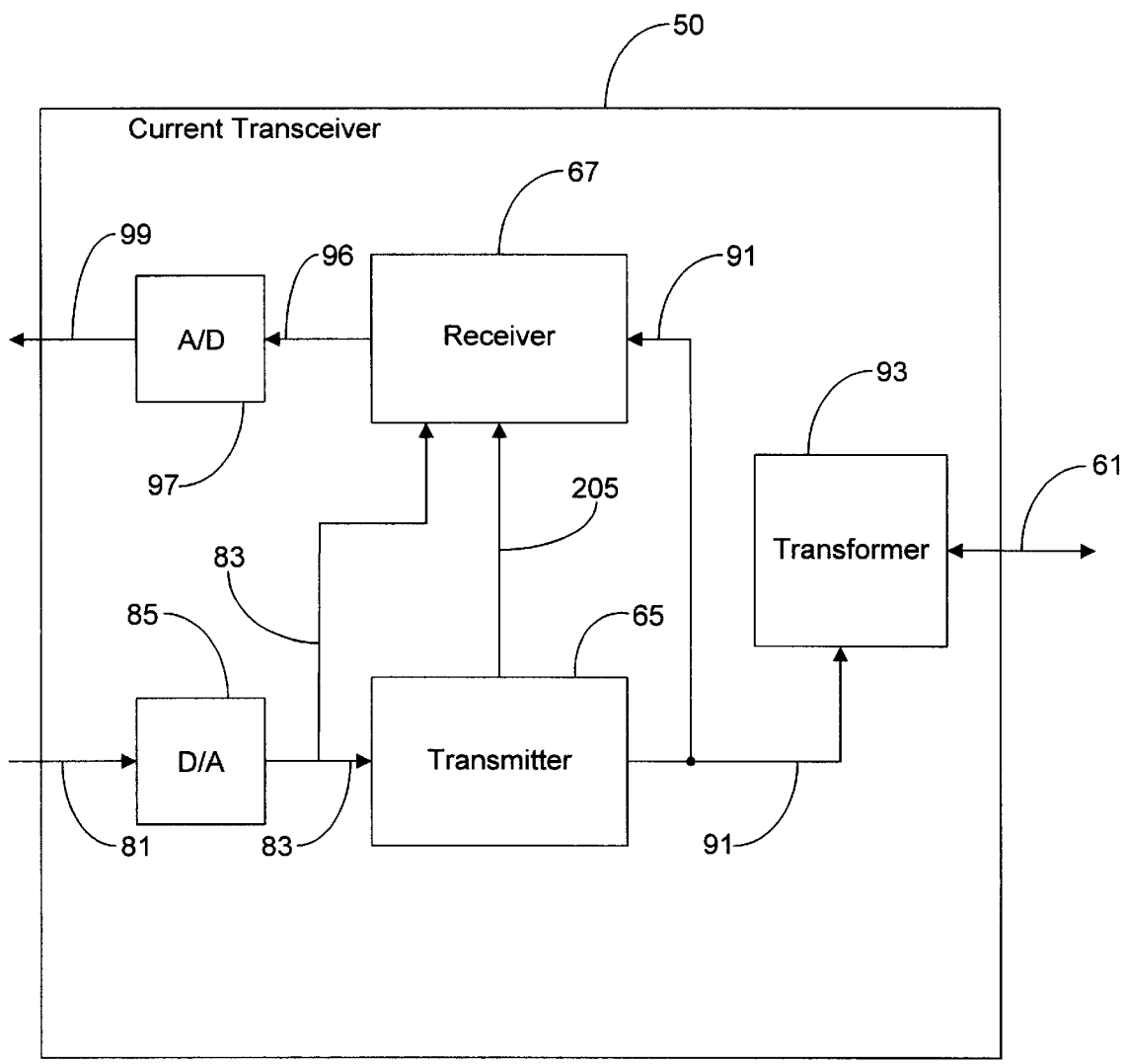
FIG. 4A is a block diagram illustrating the current transceiver of FIG. 2 in accordance with the second embodiment of the present invention

A second embodiment of the present invention will now be described with reference to FIG. 4. FIG. 4A depicts a block diagram of the second embodiment which is identical to FIG. 3A except that connection 83 and a connection 205 are coupled to receiver 67.

Transmitter

Figure 4B:
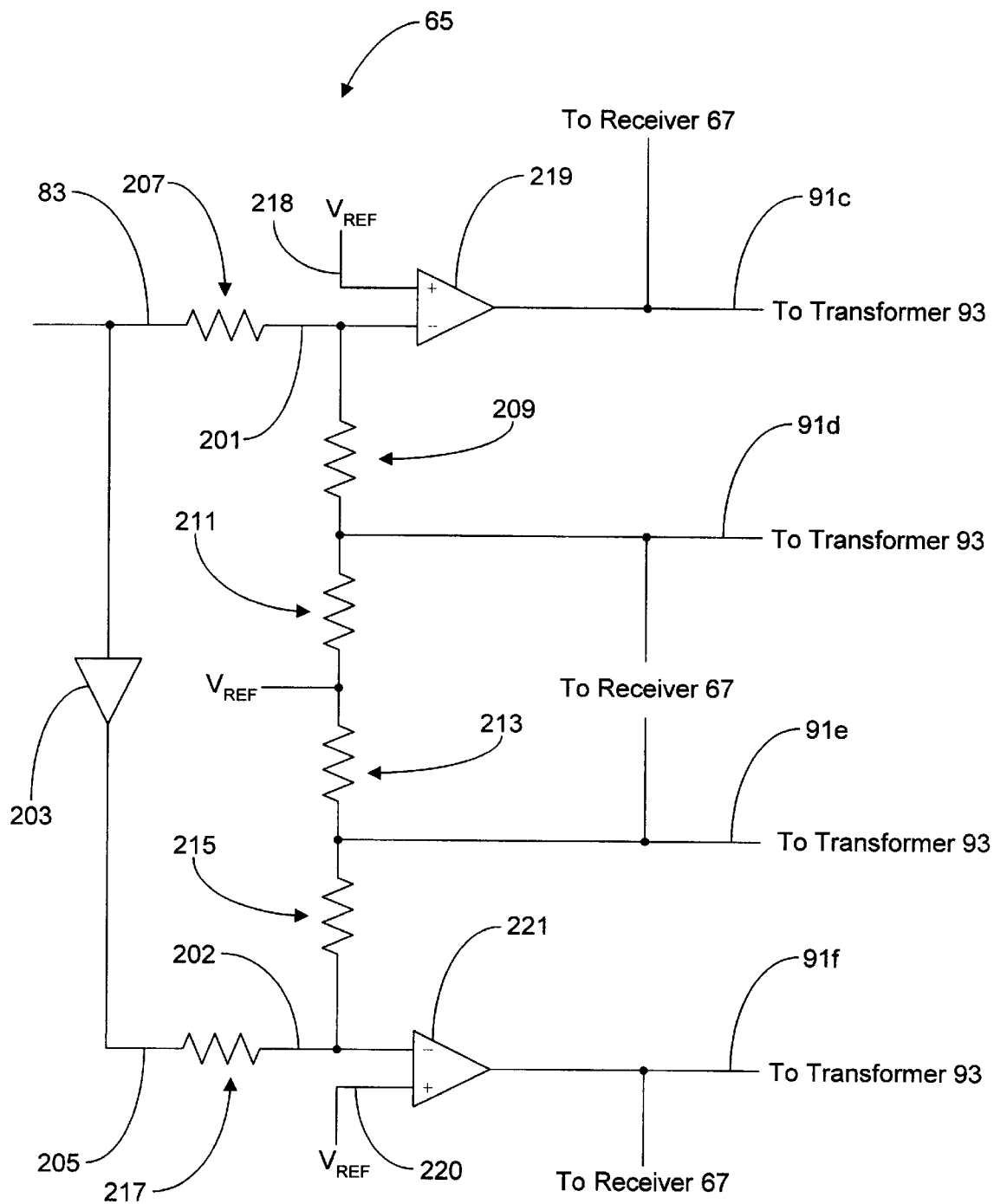
FIG. 4B is a schematic diagram illustrating the transmitter of FIG. 4A.

A transmitter 65 in accordance with the second embodiment of the present invention is depicted in FIG. 4B. The transmitter 65 in the second embodiment is a differential transmitter as opposed to the single-ended transmitter of the first embodiment. Therefore, transmitter 65 of the second embodiment is designed to receive an analog voltage signal from digital-to-analog converter 85 on connection 83 and to output a balanced differential signal on connection 91 instead of an asymmetrically shifted signal Alternatively, the transmitter 65 of the second embodiment could receive balanced differential current signals, for example, from a suitable digital-to-analog converter 85, at connections 201 and 202 making components 203, 207, and 217 unnecessary. If components 203, 207 and 217 are removed, then the signal on line 83 from digital-to-analog converter 85 could be a differential voltage signal applied to connections 218 and 220.

Figure 4C:
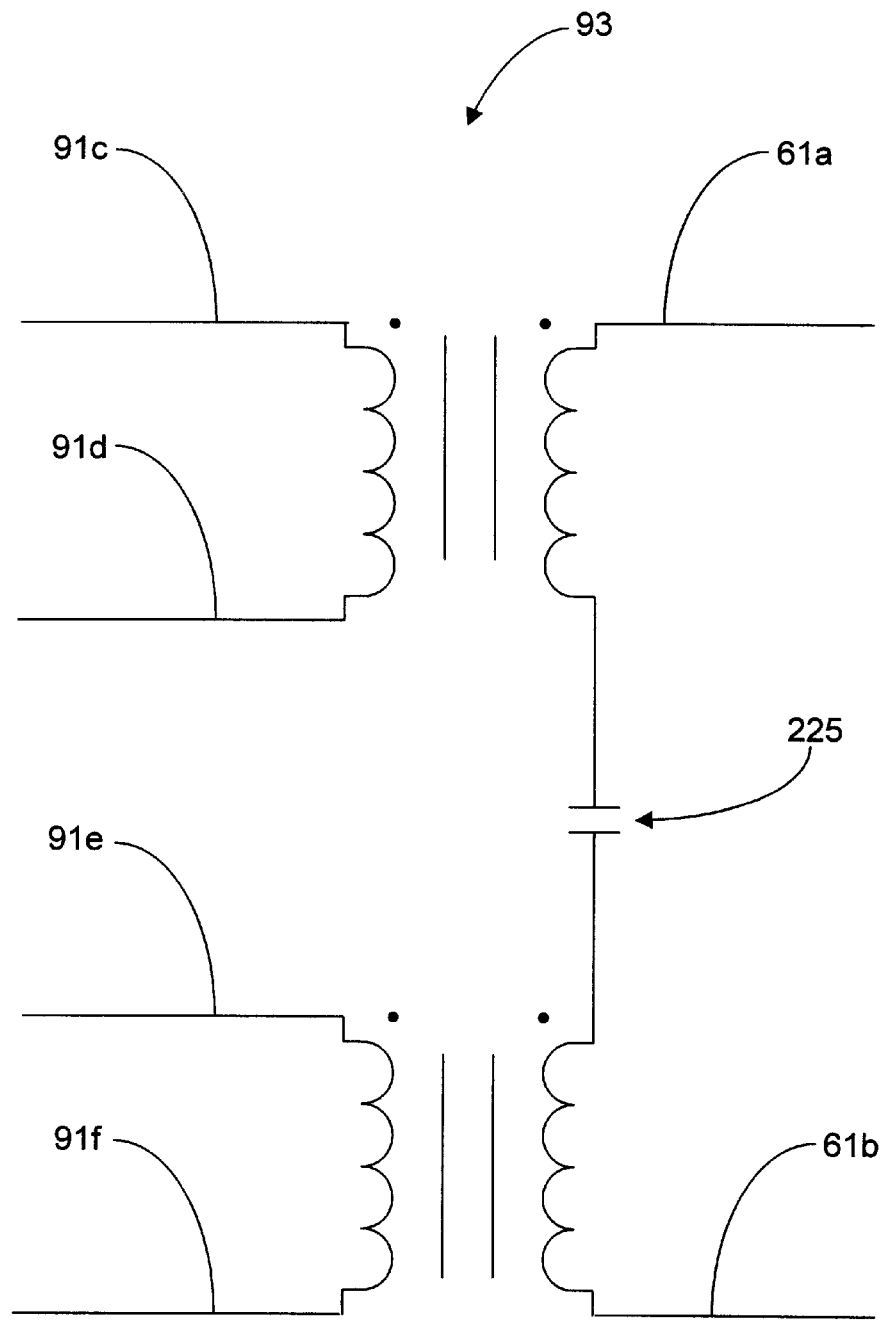
FIG. 4C is a schematic diagram illustrating the transformer of FIG. 4A.

After receiving the analog signal from digital-to-analog converter 85, voltage inverter 203 is designed to apply the inverse of the signal on connection 83 to connection 205 Resistors 207–217 and operational amplifiers 219 and 221 are designed to amplify the received analog signal into a differential current signal and to drive the differential current signal across connection 91 to the transformer 93 which is depicted in FIG. 4C. As depicted by FIGS. 4B and 4C, connection 91, in the second embodiment, is a four line connection consisting of lines 91c, 91d, 91e, and 91f.

Table 3 depicts an example set of possible values of capacitor 225 (FIG. 4C) and resistors 207–217 (FIG. 4B) that are sufficient to transmit a balanced through transformer 93 to connection 61.

TABLE 3

| DEVICE | VALUES |
| --- | --- |
| 207 | 1000 Ohms |
| 209 | 60.4 Ohms |
| 211 | 10 Ohms |
| 213 | 10 Ohms |
| 215 | 60.4 Ohms |
| 217 | 1000 Ohms |
| 225 | .22 micro-Farads |

It should be apparent to one ordinarily skilled in the art that it is possible to modify the values in Table 3 without departing from the principles of the present invention.

Receiver

Figure 4D:
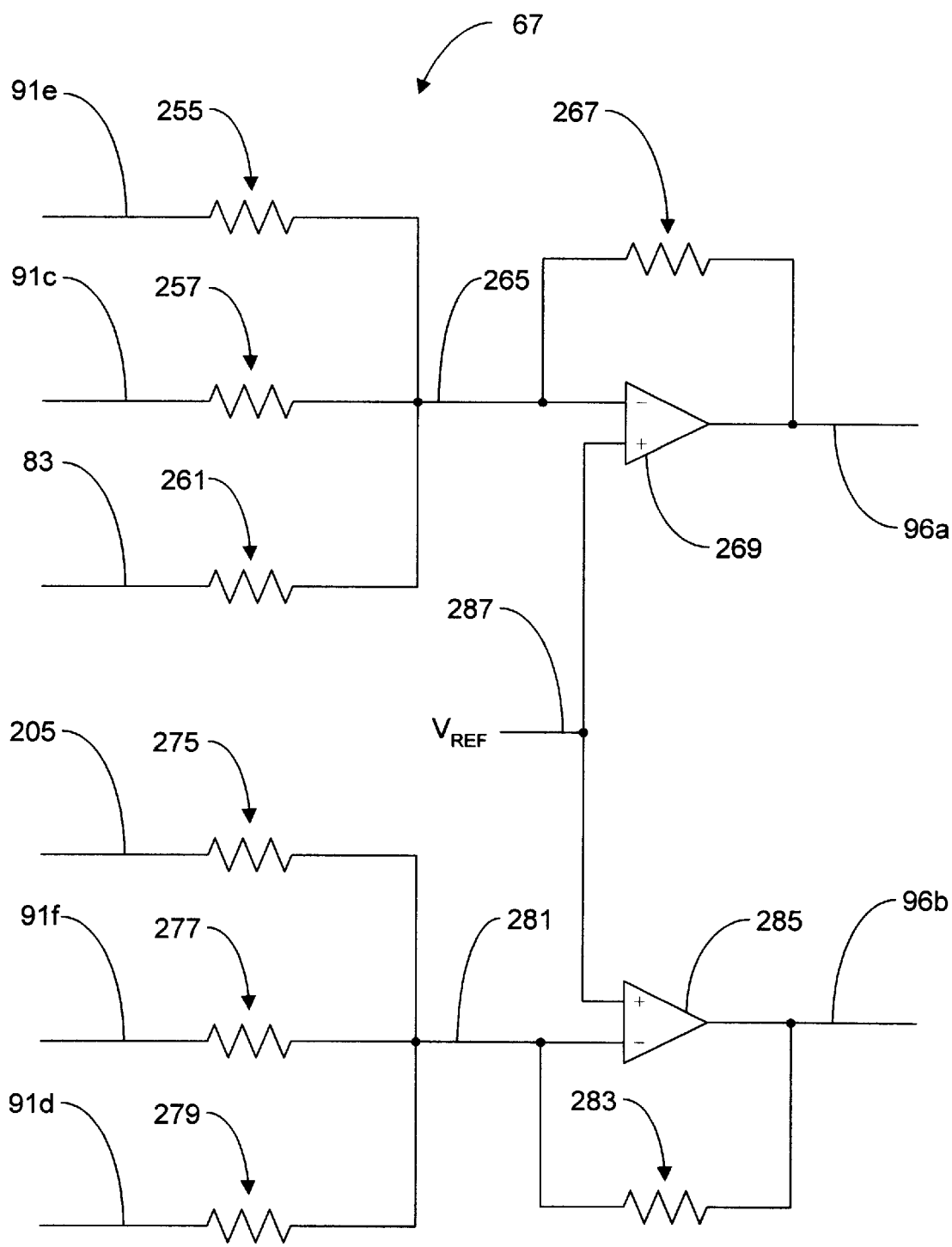
FIG. 4D is a schematic diagram illustrating the receiver of FIG. 4A.

Receiver 67 of the second embodiment of the present invention is depicted in FIG. 4D. Signals on connections 91e, 91c, and 83b are applied through resistors 255, 257 and 261, respectively, to connection 265. The signal on connection 265 also includes a feedback signal via resistor 267 and forms an input to operational amplifier 269.

The signals on connections 205, 91f and 91d are applied through resistors 275, 277 and 279, respectively, to connection 281. The signal on connection 281 also includes a feedback signal via resistor 283 and forms an input to operational amplfier 285. Furthermore, a reference voltage ($V_{ref}$) is applied to the positive terminals of operational amplifiers 269 and 285 via connection 287, and the output of operational amplifiers 269 and 285 forms the differential signal applied to analog-to-digital converter 97 through lines 96a and 96b, respectively, as discussed hereinbefore.

Sufficient values of the resistors in FIG. 4D for correct operation of the second embodiment are depicted in Table 4 hereafter, as examples.

TABLE 4

| DEVICE | VALUES (OHMS) |
|---|---|
| 255 | 10,000 |
| 257 | 10,000 |
| 261 | 42,328 |
| 267 | 10,000 |
| 275 | 42,328 |
| 277 | 10,000 |
| 279 | 10,000 |
| 283 | 10,000 |

It should be apparent that the values in Table 4 may be altered without departing from the principles of the present invention.

It should be noted that the signals on connections 83 and 205 of the second embodiment of receiver 67 perform the functionality of cancellation of the transmit signal of transmitter 65 during full-duplex communication. Therefore, it should be apparent to one ordinarily skilled in the art that, in half-duplex communication, connections 83 and 205 and the associated resistors 261 and 275 in receiver 67 are not necessary for implementation of the present invention.

The second embodiment of the present invention differs from the first embodiment in that receiver 67 of the first embodiment receives an asymmetrical shifted signal from transmitter 65 of FIG. 3C and rebalances the signal around ground through inverting stages. The first embodiment minimizes the number of components and provides a differential output without large, if any, asymmetrical gain. The transmitter 65 of the second embodiment, on the other hand provides a balanced differential signal so that receiver 67 of the receiving transceiver 50 does not need to perform any rebalancing functionality. Which embodiment is desirable depends on the particular application for the invention.

Operation

The preferred use and operation of the communication subscriber loop system 45 and associated methodology are described hereafter.

Initially, a connection 61 is established between current transceiver 50a, 50b, 50c and 50d as depicted in FIG. 2. Current transceiver 50a terminates one end of connection 61 and either transceiver 50b, 50c or 50d terminates the other end of connection 61. A more detailed discussion of terminating each end of connection 61 is described in U.S. Pat. No. 5,999,619 entitled "Synthetic Termination," filed on Dec. 17, 1997 by Thomas Bingel, which is incorporated herein by reference as if set forth in full hereinbelow.

For illustrative purposes only, assume current transceiver 50d terminates the customer premises end of connection 61. In this case, current transceivers 50b and 50c are bridged to connection 61 such that any signal transmitted by current transceiver 50a is simultaneously received by current transceivers 50b, 50c and 50d. It is assumed that current transceivers 50b, 50c and 50d are capable of determining which signals transmitted by current transceiver 50a are destined for current transceivers 50b, 50c and 50d, respectively. Therefore, each current transceiver 50b, 50c and 5d only processes the signals that are destined for it.

Assume further, for the illustrative purposes only, that current transceiver 50a receives a digital signal, generated by a current source (not shown) on connection 81 destined for current transceiver 50c. After passing the signal on connection 81 through digital-to-analog converter 85, transmitter 65 drives the signal across connection 91 and transformer 93 to connection 61. In the first embodiment of the present invention, the signal on connection 91 is an asymmetrically shifted signal, and in the second embodiment, the signal is a differential balanced signal, as discussed hereinbefore. In both embodiments, the signal at connection 61 is differential and balanced.

Receiver 67 of current transceiver 50c receives the signal on connection 61 via connection 91 and transformer 93 of transceiver 50c. The circuitry of receiver 67 in current transceiver 50c receives and amplifies the signal on connection 91. Furthermore, the circuitry of receiver 67 in the first embodiment also rebalances the received signal with respect to ground.

Receiver 67 then outputs the amplified balanced signal on connection 96, where analog-to-digital converter 97 converts the signal into a digital signal on connection 99, The digita signal on connection 99 is then transmitted to a processing device in data communication equipment (not shown) which processes the signal on connection 99 in accordance with principles established in the prior art.

It should be noted that while the operation of the present invention has been discussed with reference to communication from transceiver 50a to transceiver 50c, the present invention is not so limited. It should be apparent to one ordinarily skilled in the art upon reading of this application that the operation is similar for communication between any two transceivers 50 constructed in accordance with the principles of the present invention.

In this regard, multiple transceivers 50 may be located at the central office 13 wherein each central office transceiver 50 is in communication with either a single transceiver 50 or multiple transceivers 50 at the customer premises 15. Furthermore, the transceivers 50 of the present invention may be implemented in any environment and are not limited to implementation and operation at a central office 13 and a customer premises 15.

In concluding the detailed description, it should be noted that it will be obvious to those skilled in the art that many variations and modifications may be made to the preferred embodiment without substantially departing from the principles of the present invention. All such variations and modifications are intended to be included herein within the scope of the present invention, as set forth in the following claims.

What is claimed is:

1. A transceiver for communicating with a device at a central office via a subscriber loop, comprising:

a transmitter having a current driver, said current driver coupled to a current source and to said subscriber loop, said current driver configured to drive a current signal across said subscriber loop, said current signal produced by said current source; and a receiver coupled to said subscriber loop, wherein said transceiver fails to provide a termination for said subscriber loop while driving said current signal.

2. The transceiver of claim 1, wherein said transmitter is configured to convert said current signal into a differential balanced signal.

3. The transceiver of claim 1, wherein said transceiver is simultaneously in communication with a plurality of transceivers coupled to said subscriber, loop and wherein said subscriber loop is an analog connection.

4. The transceiver of claim 1, wherein said subscriber loop includes a first connection and a second connection, each of said first and second connections extending from said central office to a customer premises, and wherein said current driver includes an operational amplifier having an output port coupled to said first connection and having an input port coupled to said second connection, said output port coupled to said second connection via a resistor.

5. A system for communicating between a central office and a customer premises, comprising:

a subscriber loop coupled to a communication device at said central office;

a first transceiver coupled to said subscriber loop and providing a termination for said subscriber loop during a communication session between said first transceiver and said communication device at said central office; and a second transceiver coupled to said subscriber loop without providing a termination for said subscriber loop during said communication session, said second transceiver configured to drive a current signal produced by a current source across said subscriber loop during said communication session.

6. The system of claim 5, wherein said first and second transceivers are coupled to a customer premises end of said subscriber loop.

7. The system of claim 6, wherein said communication device at said central office provides a termination for said subscriber loop during said communication session between said first transceiver and said communication device.

8. The system of claim 5, wherein said subscriber loop includes a first connection and a second connection, each of said first and second connections extending from said central office to said customer premises, and wherein said second transceiver includes a driver for driving said current signal across said subscriber loop, said driver of said second transceiver including an operational amplifier having an output port coupled to said first connection and having an input port coupled to said second connection, said output port of said second transceiver coupled to said second connection via a first resistor.

9. The system of claim 8, wherein said first transceiver includes a driver for driving signals across said subscriber loop, said driver of said first transceiver including an operational amplifier having an output port coupled to said first connection and having an input port coupled to said second connection, said output port of said first transceiver coupled to said second connection via a second resistor.

10. The system of claim 9, wherein said second resistor has approximately 135 Ohms of resistance.

11. The system of claim 10, wherein said first resistor has approximately 13500 Ohms of resistance.

12. A method for communicating between a central office and a customer premises, comprising:

terminating a subscriber loop via a first transceiver during a communication session between said first transceiver and a communication device at said central office;

transmitting a first signal from said first transceiver to said communication device via said subscriber loop during said communication session;

producing a current signal via a current source; and transmitting, during said communication session, said current signal from a second transceiver to said communication device via said subscriber loop while said second transceiver is coupled to but fails to terminate said subscriber loop.

13. The method of claim 12, wherein said first and second transceivers are coupled to a customer premises end of said subscriber loop.

14. The method of claim 12, wherein said subscriber loop includes a first connection and a second connection, each of said first and second connections extending from said central office to said customer premises, and wherein said transmitting said current signal step further comprises the steps of:

amplifying said current signal via a first operational amplifier in said second transceiver;

transmitting said current signal from an output port of said first operational amplifier to said first connection of said subscriber loop;

transmitting said current signal from said output port of said first amplifier through a first resistor to said second connection; and transmitting said current signal from said second connection to an input port of said first operational amplifier.

15. The method of claim 14, wherein said transmitting signal from said first transceiver step further comprises the steps of:

amplifying said first signal via a second operational amplifier in said first transceiver;

transmitting said first signal from an output port of said second operational amplifier to said first connection of said subscriber loop;

transmitting said first signal from said output port of said second operational amplifier through a second resistor to said second connection; and transmitting said first signal from said first connection to an input port of said second operational amplifier.

16. The method of claim 15, wherein said second resistor has approximately 135 Ohms of resistance.

17. The method of claim 16, wherein said first resistor has approximately 13500 Ohms of resistance.

18. A transceiver for bridging multiple communication devices to a single communication connection, comprising:

a current source;

a transmitter having a current driver, said current driver coupled to said current source and to said communication connection; and a receiver coupled to said communication connection;

wherein said communication connection connects a communication device at a central office to a communication device at a customer premises, and wherein said transceiver includes:

a first operational amplifier having at least one input terminal and an output terminal, said at least one input terminal of said first operational amplifier coupled to said communication connection, said output terminal of said first operational amplifier coupled to said at least one input terminal of said first operational amplifier via a first resistor;

a second operational amplifier having at least one input terminal and an output terminal, said at least one input terminal of said second operational amplifier coupled to said output terminal of said first operational amplifier, said output terminal of said second operational amplifier coupled to said at least one input terminal of said second operational amplifier via a second resistor;

a third operational amplifier having at least one input terminal and an output terminal, said at least one input terminal of said third operational amplifier coupled to said communication connection and to said at lest one input terminal of said second operational amplifier, said output terminal of said third operational amplifier coupled to said at least one input terminal of said third operational amplifier via a third resistor; and a fourth operational amplifier having at least one input terminal and an output terminal, said at least one input terminal of said fourth operational amplifier coupled to said output terminal of said third operational amplifier and to said at least one input terminal of said first operational amplifier, said output terminal of said fourth operational amplifier coupled to said at least one input terminal of said fourth operational amplifier via a fourth resistor.

* * * * *

United States Patent And Trademark Office
CERTIFICATE OF CORRECTION

PATENT NO. : 6,078,613
DATED : June 20, 2000
INVENTOR(S): Thomas J. Bingel

It is certified that error appears in the above-identified patent and that said Letters Patent is hereby corrected as shown below.

Col. 9, line 12, delete "subscriber, loop" and replace with -- subscriber loop, --.
Col. 11, line 13, delete "lest" and replace with -- least --.

Signed and Sealed this

Seventeenth Day of April, 2001

*Attest:*

NICHOLAS P. GODICI

*Attesting Officer*     *Acting Director of the United States Patent and Trademark Office*